United States Patent [19]

Russo

[11] Patent Number: 5,431,482
[45] Date of Patent: Jul. 11, 1995

[54] HORIZONTAL NATURAL GAS STORAGE CAVERNS AND METHODS FOR PRODUCING SAME

[75] Inventor: Anthony Russo, Albuquerque, N. Mex.

[73] Assignee: Sandia Corporation, Albuquerque, N. Mex.

[21] Appl. No.: 135,810

[22] Filed: Oct. 13, 1993

[51] Int. Cl.⁶ .................. E21B 43/28; E21F 17/16
[52] U.S. Cl. ................................... 299/4; 299/5; 405/55
[58] Field of Search ................ 299/4, 5, 6, 17; 405/55, 57, 58; 166/50

[56] References Cited

U.S. PATENT DOCUMENTS

| | | | |
|---|---|---|---|
| H614 | 4/1989 | Norman, Sr. .................... 405/58 X |
| 2,365,428 | 12/1944 | Muskat . | |
| 2,720,390 | 10/1955 | Brooks . | |
| 2,810,263 | 10/1957 | Raymond . | |
| 2,842,204 | 7/1958 | Horner . | |
| 2,861,428 | 11/1958 | Hendrix . | |
| 2,869,328 | 1/1959 | Gibson et al. . | |
| 2,880,587 | 4/1959 | Hendrix et al. . | |
| 3,068,654 | 12/1962 | Warren . | |
| 3,096,969 | 7/1963 | Edmonds et al. . | |
| 3,277,654 | 10/1966 | Shiver . | |
| 3,347,595 | 10/1967 | Dahms et al. .................... 299/4 |
| 3,374,633 | 3/1968 | Brandt . | |
| 3,632,171 | 1/1972 | French et al. .................... 299/5 |
| 3,716,272 | 2/1973 | Davis, II .................... 299/5 |
| 3,724,898 | 4/1973 | Jacoby .................... 299/5 |
| 3,873,156 | 3/1975 | Jacoby .................... 299/4 |
| 3,941,422 | 3/1976 | Henderson .................... 299/4 |
| 4,007,964 | 2/1977 | Goldsmith .................... 299/4 |
| 4,226,475 | 10/1980 | Frosch et al. .................... 299/13 |
| 4,248,302 | 2/1981 | Churchman .................... 166/272 |
| 4,300,801 | 11/1981 | Steenge .................... 299/5 |
| 4,328,995 | 5/1982 | Fenstermaker .................... 299/17 |
| 4,415,206 | 11/1983 | Hodges .................... 299/17 |
| 4,425,003 | 1/1984 | Huff .................... 299/5 |
| 4,437,706 | 3/1984 | Johnson .................... 299/7 |
| 4,488,834 | 12/1984 | Hooper et al. .................... 405/58 |
| 4,536,035 | 8/1985 | Huffman et al. .................... 299/17 |
| 4,596,490 | 6/1986 | Van Fossan et al. .................... 405/58 |
| 4,906,048 | 3/1990 | Babichev et al. .................... 299/17 |
| 5,016,710 | 5/1991 | Renard et al. .................... 166/245 |
| 5,065,821 | 11/1991 | Huang et al. .................... 166/245 |
| 5,129,759 | 7/1992 | Bishop .................... 405/59 |
| 5,246,273 | 9/1993 | Rosar .................... 299/4 |

FOREIGN PATENT DOCUMENTS

| | | | |
|---|---|---|---|
| 2397998 | 3/1979 | France .................... 405/58 |
| 720142 | 3/1980 | U.S.S.R. .................... 299/4 |
| 876968 | 10/1981 | U.S.S.R. .................... 299/4 |

*Primary Examiner*—David J. Bagnell
*Attorney, Agent, or Firm*—Pravel, Hewitt Kimball & Krieger

[57] ABSTRACT

The invention provides caverns and methods for producing caverns in bedded salt deposits for the storage of materials that are not solvents for salt. The contemplated salt deposits are of the bedded, non-domed variety, more particularly salt found in layered formations that are sufficiently thick to enable the production of commercially usefully sized caverns completely encompassed by walls of salt of the formation. In a preferred method, a first bore hole is drilled into the salt formation and a cavity for receiving insolubles is leached from the salt formation. Thereafter, at a predetermined distance away from the first bore hole, a second bore hole is drilled towards the salt formation. As this drill approaches the salt, the drill assumes a slant approach and enters the salt and drills through it in a horizontal direction until it intersects the cavity for receiving insolubles. This produces a substantially horizontal conduit from which solvent is controlledly supplied to the surrounding salt formation, leaching the salt and producing a concentrated brine which is removed through the first bore hole. Insolubles are collected in the cavity for receiving insolubles. By controlledly supplying solvent, a horizontal cavern is produced with two bore holes extending therefrom.

12 Claims, 3 Drawing Sheets

HORIZONTAL NATURAL GAS STORAGE CAVERNS AND METHODS FOR PRODUCING SAME

BACKGROUND OF THE INVENTION

1. Field of the Invention

This invention relates to storage facilities and methods for creating these facilities for storing materials such as fluid hydrocarbons in underground caverns created in naturally-occurring geological formations. More specifically, the invention relates to the creation of storage caverns in naturally-occurring substantially horizontal layers of salt deposits.

2. Description of the Related Art

It is known in the art to create storage caverns in large naturally-occurring salt domes for the purpose of storing natural gas and other light hydrocarbons, such as ethane, propane, and butane, as well as crude oil. However, of the naturally-occurring salt formations, salt domes are the exception. By far the majority of salt formations are in the form of salt deposits of a non-domed structure. More typically, these salt deposits may be in the form of layered formations of salt interposed between layers of bed rock or bed rock and overburden. These deposits frequently occur in substantially horizontal layers of varying thickness.

While it is readily apparent that salt domes may be utilized for the creation of storage caverns that are elongate in a vertical direction, for the storage of natural gas, it has not heretofore been known to utilize substantially horizontal layered salt formations for the creation of storage caverns for natural gas or other hydrocarbons. Whereas it may be possible to produce "vertical storage caverns" in layered salt formations, the storage cavern will normally extend through several layers, including layers that are of a nonsalt type and that may be permeable to the hydrocarbon being stored. Thus, there is always the possibility of leakage, especially gas leakage, through intervening layers between the salt layers. If the vertical cavern does not extend through several layers then it is usually too small to be of commercial interest because of the relative shallowness of any one layer of salt.

U.S. Pat. No. 3,873,156 shows the solution mining of layers of salt deposits. The method appears to show a first and second bore and a device, a solvent delivery nozzle, that may be guided horizontally for leaching salt. The method requires drilling two or more bore holes intersecting a bedded salt deposit which includes a "geological anomaly" which prevents the effective coalescing of the bore holes. The salt deposit is hydraulically fractured from one of the bore holes as far as feasible towards the other bore hole. Thereafter, a horizontally extending passageway is solution mined from the lower end of one of the bore holes, through the salt bed and through the geological anomaly, into communication with the hydraulically fractured passageway. This provides a solution mining cavity through which a solvent fluid can be passed from one of the bore holes and withdrawn from the other bore hole in order to enlarge the cavity. However, the means utilized for making the cavern is not a means that provides for controlled leaching of salt but rather a solvent delivery nozzle. Further, there is no indication that the cavern produced is capable of use for storage of fluid materials.

U.S. Pat. No. 2,810,263 is directed to a natural gas storage cavern. From the drawings, the cavern produced appears to be horizontal albeit that the cavern has vertical supports.

U.S. Pat. No. 2,880,587 shows vertical storage caverns that are in communication through a horizontal channel. Again, this is significantly different than producing a horizontally-oriented storage cavern in a layered salt deposit. The patent merely shows how to utilize 2 bore holes (one for pumping in fresh water, the other for removing brine) to cause communication between vertical caverns.

U.S. Pat. No. 3,347,595 also shows how to establish communication between bore holes in solution mining. Again, there is no teaching or suggestion regarding horizontal storage caverns or methods for producing these.

U.S. Pat. No. 3,374,633 discusses underground storage facilities and their construction using first and second bore holes. The method utilizes a solution, which is a non-solvent for the material of the formation (salt) as a fracturing material. Once the material is fractured, a solvent material is injected through one bore hole and concentrated brine removed from the second bore hole. In this way, a storage cavern is formed between the two bore holes, as best illustrated in FIG. 3 of the patent.

Since salt deposits are much more widely distributed across the United States and the world than salt domes, it would be highly desirable if a method could be developed for the creation of storage caverns of commercially useful size in layered salt deposits. Further, the method should produce storage caverns that are stable and useful for the storage of products ranging from natural gas through light hydrocarbons to heavy hydrocarbons, such as crude oil, and other fluids that are not solvents for the salts of the formation

SUMMARY OF THE INVENTION

The invention provides storage caverns in bedded salt formations, especially substantially horizontally disposed layered salt formations. The storage caverns include a cavern cavity within the salt formations. Preferably, the cavity has a longest axis in a substantially horizontal plane, so that the cavity lies totally enclosed within the bedded or horizontally disposed salt formation. The storage cavern cavity is surrounded by walls, the walls comprising compacted salt that form a tight, impermeable salt formation that is capable of withstanding diffusion by natural gas, light hydrocarbons, and heavy hydrocarbons through its structure. Further, the storage cavern has a bore hole casing in fluid communication with the cavern cavity and extending to above the ground surface for charging material to be stored into the cavern cavity and for removing stored materials from the cavity.

The invention further provides methods for producing storage caverns in naturally-occurring subterranean bedded, stratified, or layered salt formations, preferably substantially horizontal salt formations. One method includes the steps of drilling a first bore hole from an above-ground surface location towards a substantially horizontal underground salt formation. Thereafter, while drilling, the bore hole is slanted so that it enters the salt formation to produce an elongate conduit in the salt formation that extends along a substantially horizontal plane within the underground salt formation. The elongate conduit is provided with a means for controlledly supplying a solvent for salt and solvent is charged to this means to leach solvent from the substantially horizontal salt formation. Under controlled leaching, a cavity is created in the substantially horizontal underground salt formation that has walls comprising compressed salt crystals and that are substantially impermeable to materials such as natural gas, light hydrocarbons, crude oil, and the like.

In a preferred embodiment of the method, a second bore hole is drilled, at a preselected distance from the first bore hole, into the substantially horizontal underground salt formation. A smaller cavity for receiving insolubles is leached from the salt formation through this second bore hole. The slanting of the first bore hole is directed to intersect with this cavity for receiving insolubles. Thus, when solvent is charged into the means for controlledly supplying solvent for dissolving salt, the solvent dissolves salt from the surrounding salt formation and the resulting saline brine collects in the cavity for receiving insolubles from which it is withdrawn through the second bore hole. At the same time, insolubles from the leached salt contained in the saline solution is deposited within the cavity for receiving insolubles.

In order to practice the method according to the invention, a means for controlledly leaching solvent from the underground formation is necessary. In a preferred embodiment, this means includes a longitudinal tubular casing supplied with holes of varying sizes and at various locations along its length for charging solvent to the horizontal salt formation to leach salt from the formation and create a cavity. The sizes and locations of these holes are determined by a calculation based upon a determination of both fluid and mass transfers that take place when a horizontal storage cavern is being leached. Thus, the holes are sized to provide the required pressure drop to enable a predetermined rate of solvent flow out of various holes along the length of the conduit. Further, the required solvent flows at various holes along the conduit are dictated by the expected concentration gradients between solvent and salt at the location of each hole which in turn determine the rate of salt leaching. The rate of salt leaching at each point along the conduit in turn dictates the shape of the resultant portion of the cavity in the salt formation that will be leached by the solvent.

The invention provides, for the first time, a method for economically utilizing the more abundant layered salt deposits found within the United States and elsewhere for the storage of fluid materials, and relieves the stores of products from reliance upon the limited availability of salt domes. Further, since the salt deposits are more widely distributed than salt domes, stores of products are relieved from the burden of often storing product at a great distance from markets or suppliers and may now have the flexibility, depending upon the availability of nearby salt deposits, to store products in a location that is economically more desirable.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

The invention provides storage caverns in non-domed, bedded salt deposits, preferably substantially horizontal salt deposits. The invention further provides methods for producing caverns in such substantially horizontal layered salt deposits.

Figure 1:
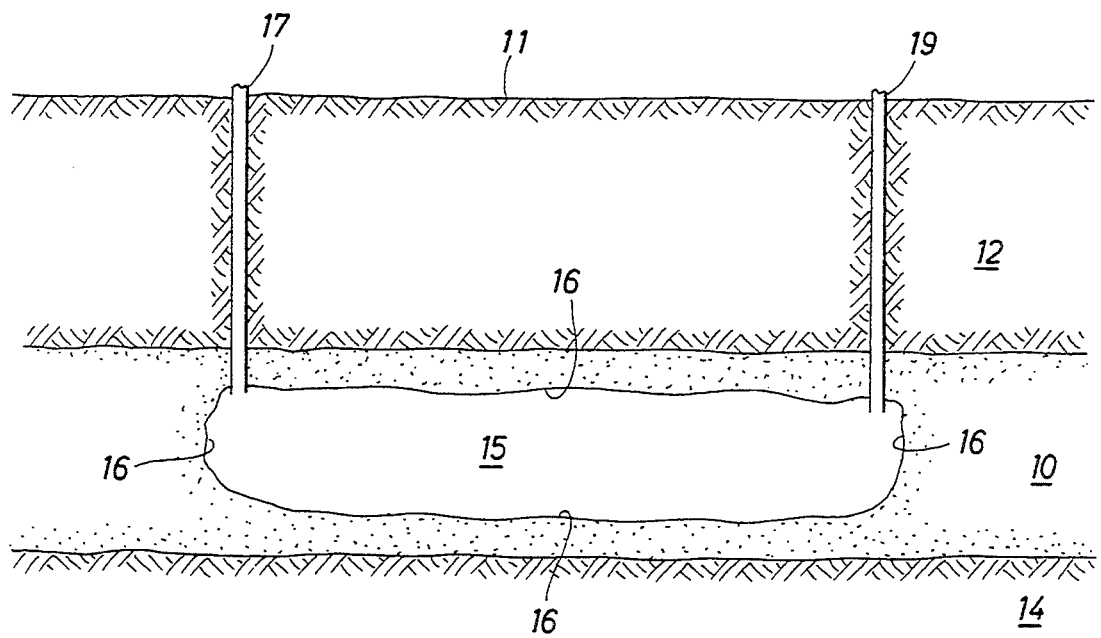
FIG. 1 is a schematic diagram depicting a naturally-occurring substantially horizontal salt formation with a storage cavern according to a preferred embodiment of the invention therein.

The preferred embodiments of the invention are more clearly understood when explained in relation to the Figures. In FIG. 1 depicting an embodiment of the invention's storage caverns, a salt formation 10 is sandwiched between overburdened layers 12 and lower layers 14. A cavity 15 extends into the salt formation 10 and is surrounded, substantially on all sides, with walls of salt 16 that are substantially impermeable to the fluid to be stored in cavity 15. A first borehole 17 extends from above the ground surface 13 and is in fluid communication with the cavity 15. Further, a second bore hole, in the preferred embodiment, extends from above ground surface 11 into fluid communication with cavity 15.

Figure 2:
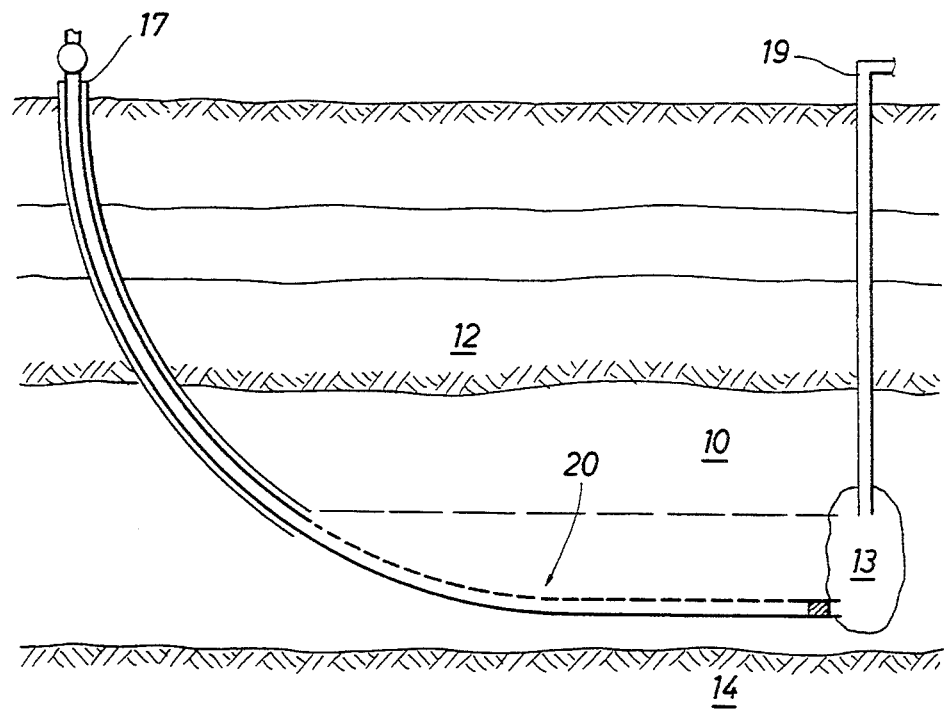
FIG. 2 is a schematic showing a preferred method of the invention being practiced using two boreholes and a cavity for receiving insolubles.

According to a preferred embodiment of the invention, the storage cavern is created by first drilling a vertical bore hole 19 into the salt formation and producing a cavity for receiving insolubles 13, as shown in FIG. 2. This cavity for receiving insolubles may be leached from the salt formation in the conventional method, which includes charging a solvent for salt into the salt formation through casing 19 and removing concentrated brine containing dissolved salt from the formation 10. The other bore hole 17 is drilled a predetermined distance away from bore hole 19 and, upon entering the salt formation, or before entering the salt formation, the drilling tool is gradually slanted into a substantially horizontal position, approximately paralleling the longitudinal axis of the formation of the salt, to intersect with the cavity for receiving insolubles 13, as shown in FIG. 2. In this manner, an elongate conduit for controlledly supplying solvent 20 may be inserted into the salt formation. By supplying solvent to this controlled solvent supply means 20, a cavity of a desired shape and size may be leached in the salt formation 10 as shown in FIG. 1. In general, solvent is charged through bore hole 17 into the means for controlledly supplying solvent. Solvent enters the salt formation and dissolves salt to produce a concentrated brine. The brine flows towards the cavity for receiving insolubles 13 and is withdrawn through bore hole 19. At the same time, insolubles carried with the concentrated brine are precipitated within cavity 13. Ultimately, the cavern created in the salt formation 10 encompasses cavity 13 to produce cavity 15 with walls 16 as shown in FIG. 1.

Figure 4:
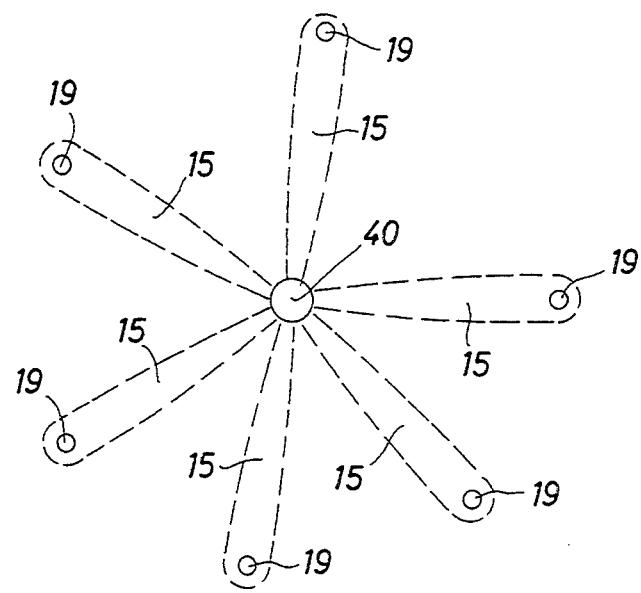
FIG. 4 is a schematic depiction of a plan view of a horizontal salt formation that is supplied with a plurality of underground storage caverns.

In a preferred embodiment, a series of storage caverns may be produced to maximize utilization of the salt formation, as shown in FIG. 4. The system of storage caverns has a central bore 40 that may comprise several bores 17 each leading to a cavern cavity 15 for charging fluids to be stored to the cavern cavity 15. Each of the caverns is supplied with a second bore hole 19, in the event that they are prepared according to the preferred method of the invention, as described above. Of course, FIG. 4 is purely schematic and the shape of the storage caverns produced may differ significantly from that shown, while still falling within the scope of the invention as herein described and claimed.

Figure 3:
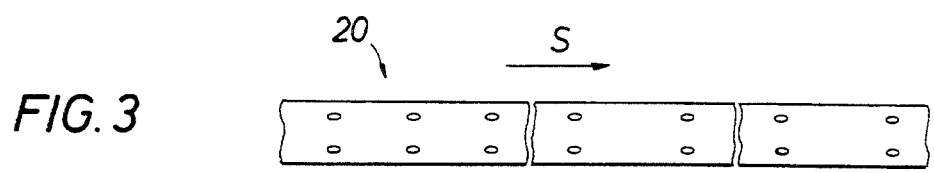
FIG. 3 is a schematic depiction of segments of the preferred means for delivering solvent at controlled rates to leach a storage cavity in an underground substantially horizontal formation.

In order to produce the preferred embodiment of the storage caverns of the invention, a means for supplying solvent under controlled conditions is needed. Such a means is shown schematically in FIG. 3, which depicts segments of conduit 20 supplied with holes. The direction of solvent flow is indicated by arrow S. The size and spacing of holes are tailored to produce the desired cavern configuration. This provides the desired rates of flow and mass transfer to effectively produce a storage cavern of the desired shape that maximizes storage capacity while utilizing as much of the salt formation as possible.

The conduit 20 may, in certain circumstances, not extend along the entire length of the proposed cavern, as shown in FIG. 2. Instead, the perforated conduit section 20 may be inserted adjacent to the cavity for receiving solubles 13, so that the end of the cavern closest to cavity 13 is first created. Then, the conduit 20 is withdrawn or moved backward so that other portions of the cavern are progressively leached from the salt formation 10 until a complete cavern 15 is produced. Alternatively, leaching may begin at a location close to borehole 17 and the conduit 20 may be moved progressively forward to create cavern 15.

In order to produce the storage caverns according to the invention, an in depth simulation of the system was first undertaken utilizing computer-assisted calculation techniques. Other simulation techniques may also be used. The techniques used include finite difference analysis that included isolating segments of finite width along the length of the elongate conduit and considering the effects of solvent flow from holes in the conduit segment, in combination with other segments up and down stream from it. This computational technique, when integrated over the entire length of the elongate means for delivering a solvent, lead to a design for the unique sizing and placement of holes on the solvent delivery means.

Figure 5:
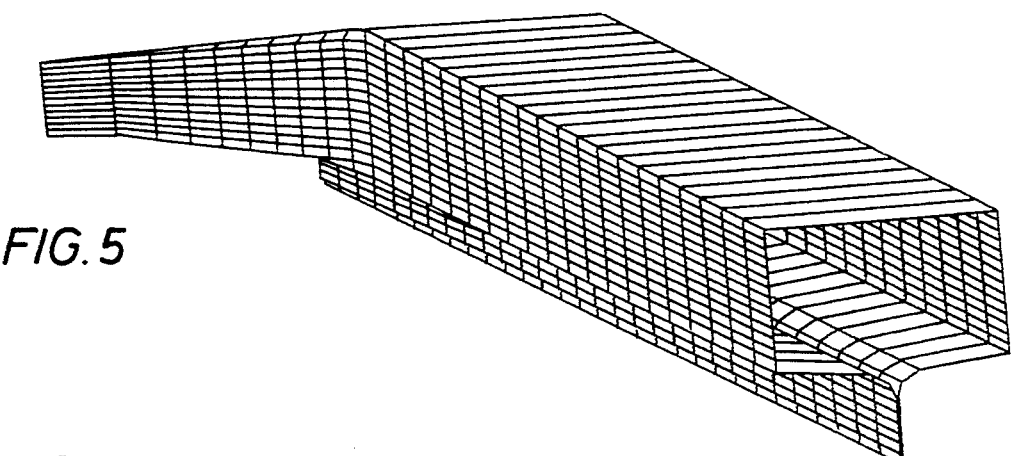
FIG. 5 is a schematic of a computer-generated shape of a salt cavern produced according to the invention.

In performing this analysis, that included information regarding the composition of salt formations, it became apparent that insoluble particulates present in the salt formation would play an important role. As a result, calculations were developed to take into account the nature of these particles and that they would be present in a fluid environment, namely the solvent, so that they would be subject to fluidization, somewhat like that experienced by particulates in a fluidized bed. The behavior of these particles and their effect upon fluid and mass transfer resulted in the shape of the caverns of the preferred embodiment shown in FIG. 5.

Figure 6:
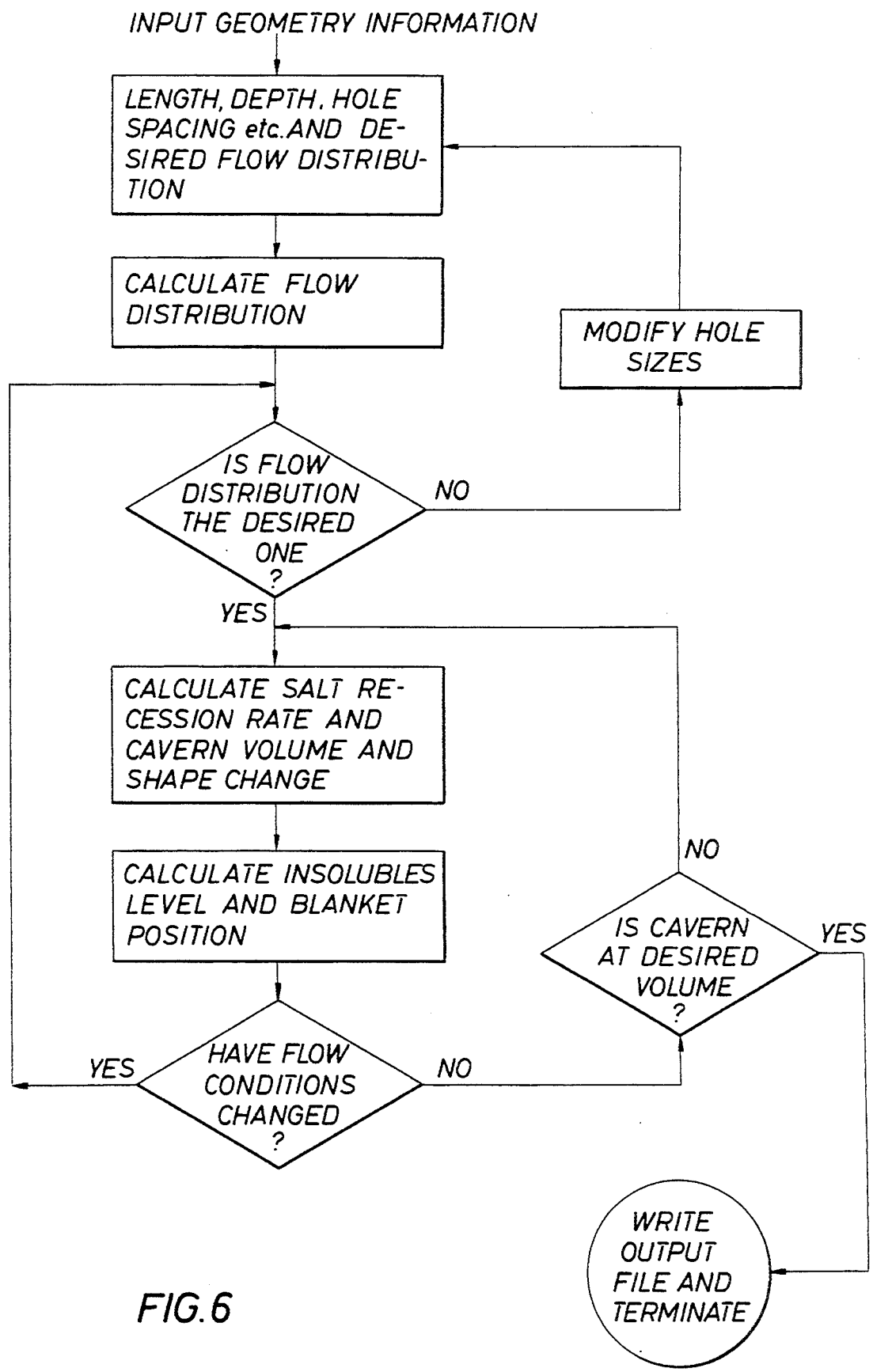
FIG. 6 is a flowchart of an exemplary computer program that may be used to simulate the leaching of a cavern according to the invention.

An exemplary flow diagram for simulation of the method of the invention for producing salt caverns in bedded salt deposits is shown in FIG. 6. While other simulation techniques and methods may be used, in this particular exemplary simulation, the geometry of the conduit 20 is input, these include length, hole spacing, depth in the salt bed, and a desired flow distribution. The program then calculates flow distribution and checks whether the calculated flow distribution approximates the desired flow distribution. If not, hole sizes are modified and the calculation repeated until a sufficiently close match is obtained between the calculated flow distribution and the desired flow distribution. Once such a close match has been obtained, salt dissolution (or recession) rate is calculated and the change in cavern volume and shape is determined. Further, the insolubles level is calculated. The simulation then checks whether flow conditions have changed, as a result of insolubles level. If so, then the calculation is reinitiated by selecting alternative flow distributions until solvent flow conditions sufficiently closely approximate the desired flow distribution. Once this has been achieved, the program checks whether the cavern is at the desired volume. If not, then further calculation is carried out on salt recession rates and increase in cavern volume and shape. Once the cavern has reached its desired volume, the program prints out those variables that are useful for solution mining a cavern according to the invention under controlled conditions. These variables include the length and depth of the elongate conduit and the spacing of holes in the conduit, together with the desired flow distribution at various points in time as solution mining progresses, and solvent specific gravity.

In a typical, preferred solution mining method according to the invention, a hole is slant-drilled from the surface into a salt bed so that the drill direction follows the plane of the bed with a downward component. That is, if the bed has a positive downward dip angle of $\phi$, the drill direction will terminate with a dip angle slightly greater than or equal to $\phi$. A second hole is drilled vertically from the surface to intersect the first hole at its end. The region near the intersection of these two holes will be solution mined to ensure the two holes connect. A pipe string, perforated with n holes per section, is inserted into the first hole in the region of the salt bed where a cavern is desired. Water is injected into the perforated pipe string. The end of the pipe string is blocked so all flow exits through the perforations and flows along the outside of the pipe to the vertical outlet hole. The unperforated portion of the inlet pipe is enclosed in a larger diameter pipe; thus, as the cavern is formed, a blanket of gas or liquid can be injected through the annulus to limit the height of the cavern near the inlet end of the injection string. The perforations in the inlet pipe string are not necessarily all the same diameter, but will generally decrease with distance toward the outlet. The tailoring of these hole sizes is one factor that determines cavern shape. The amount of salt dissolved depends on the amount of solvent to which it is exposed, as well as to the salinity of that solvent and its flow velocity past the salt surfaces. The maximum flow rate of solvent will occur at the outlet end of the perforated string; but the minimum salinity will occur near the inlet end of the string. The goal, therefore, is to adjust the hole sizes so the cavern shape is approximately uniform over its entire length.

Figure 7:
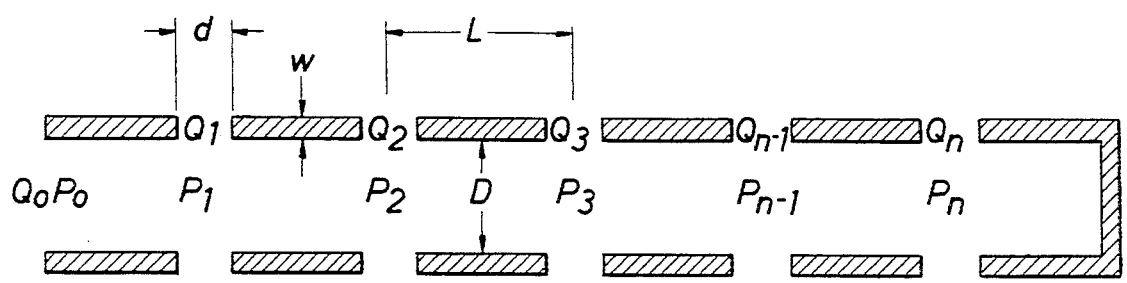
FIG. 7 illustrates a computational technique used to simulate a method of the invention for creating horizontal caverns in bedded salt deposits.

FIG. 7 shows an example of a simulation of a cavern solution mining calculation using the finite analysis technique.

The inlet pipe is completely blocked at the end. For steady incompressible flow, Bernoulli's equation may be written as:

$$\frac{v_a^2}{2} + \frac{P_a}{\rho} = \frac{v_b^2}{2} + \frac{P_b}{\rho} + h_f$$

where $v$ is velocity, P is pressure, $\rho$ is fluid density, and $h_f$ is frictional loss in the pipe. Subscripts —a— and —b— refer to any two adjacent sections of pipe.

Frictional loss is given by the Darcy-Weisbach equation:

$$h_f = f\left(\frac{Lv^2}{D2}\right)$$

where the friction factor —f— is taken to be 64/Re for Reynold's number —Re— less than 5000 and $$f = \frac{0.316}{Re^{0.25}}$$

for Re>5000 when the flow is turbulent.

Because the end of the pipe is plugged, mass conservation requires that the individual flow rates satisfy the constraint that:

$$Q_1 + Q_2 + Q_3 + \ldots + Q_{N-1} + Q_N = Q_0.$$

The exit flow rate from each section is taken to be:

$$Q_i = n\left[\frac{1}{1+f\frac{\omega}{d}}\right]^{\frac{1}{2}} \pi \frac{d^2}{4}\left[\frac{2(\Delta P_i)}{\rho}\right]^{\frac{1}{2}}$$

where n is the number of holes per section; $\omega$ is the wall thickness of the pipe; d is the orifice (exit hole) diameter; and the friction factor —f— is evaluated at the flow rate for each exit hole.

The pressure at each station —i— is given recursively by the expression:

$$P_i = P_{i-1} - \frac{64\rho L}{Re2D}\left(\frac{Q_0 - Q_1 - Q_2 - \ldots - Q_i}{(\pi D^2)/4}\right)^2$$

The above non-linear calculations are solved for the unknown variables $P_o$, $P_i$, and $Q_i$ for $1 \leq i \leq N$.

All the above calculations are carried out in a subroutine called by a minimizing function that varies the orifice sizes —d— to meet user criteria in a separate function. For example, the quantity:

$$f_n = v_{max} + \sum_1^N |Q_1 - Q_1 F^{i-1}|$$

can be minimized so the flow from each orifice decreases by the factor —F— and the flow velocity is minimized.

For the region outside the perforated pipe, but inside the salt cavity, an equation for the specific gravity of the moving solution may be written as:

$$C_k^{n+1} = FSG([C_k^n V_k W(C_k^n) + C_{k-1}^n v_{k-1} A_{k-1} \Delta t W(C_{k-1}^n) -$$

-continued $$C_k^n v_k A_k \Delta t W(C_k^n) + \mathring{A}_k \Delta z \Delta t (\rho_s \rho_\omega^{-1}) +$$

$$Q_k \Delta t C_\epsilon W(C_\epsilon)]/(C_k^{n+1}(V_k + \mathring{A}_k \Delta z \Delta t)))$$

where FSG (w) is a function that converts the weight percent of salt —w— to a specific gravity. Its inverse function is W. The other variables are: $C_k^n$ the specific gravity of the solution at the kth mesh point and nth time step; $V_k$, the volume of the kth mesh division, with $A_k$, its area; $v_k$, the bulk fluid velocity in the kth mesh division; $\Delta z$, the length of a mesh increment in the z direction (along the pipe); and $\Delta t$, the time step increment. A dot over a quantity indicates the time derivative. All quantities, except $C^{n+1}$, are evaluated at the nth time step. This equation assumes that in any region of the dissolving salt, the fluid salinity may be characterized by a single parameter in the bulk flow. That is, rapid mixing is assumed to occur outside the boundary layer due to turbulence caused by the injected water, by the convective cells generated at the dissolving salt boundary layer, and by the flow along the axial direction of the cavern.

When a vertical salt surface is exposed to unsaturated brine, a negatively buoyant dissolution boundary layer is formed next to the surface. Application of momentum integral analysis to this boundary layer and a series of verification experiments showed that, when the peak fall velocity of this boundary layer was larger compared to the edge or bulk density of the brine, the dissolution rate at a given temperature varied only with the bulk concentration of the brine and the distance along the boundary layer. The experiments showed the transition to turbulence occurred in very small lengths (typically millimeters). By analogy with turbulent heat transfer via natural convection on long vertical surfaces, the distance dependence of the dissolution rate could be neglected.

The salt recession rate of a large vertical wall of salt dissolving under the influence of natural convection has been correlated as a function of only the bulk fluid specific gravity —C— at temperatures near 75° F.

$$\frac{dr}{dt} \text{ (ft/hr)} = 45.654996C^4 - 232.2931C^3 + 469.5247C^2 -$$

$$470.37554C + 232.73686 - 45.203241/C$$

The results of the above simulation, or other similar techniques, provides valuable guidance by setting the parameters needed for carrying out the methods of leaching according to the invention and creating caverns according to the invention.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A method of producing a storage cavern in a naturally-occurring substantially horizontal underground salt formation, the method comprising:

drilling a first bore hole from an above ground surface location towards the substantially horizontal underground salt formation;

slanting the first bore hole during drilling to produce an elongate conduit extending along a substantially horizontal plane in the substantially horizontal underground salt formation;

providing said elongate conduit with a means for controlledly supplying a solvent for salt, said means comprising a perforated pipe string having holes of predetermined size, at predetermined spacing, an end of the pipe string being blocked off to divert injected solvent out of the holes;

charging solvent for salt to said means for controlledly supplying a solvent for salt; and leaching salt from the salt formation around the means for controlledly supplying a solvent for salt, to produce a cavity extending into the salt formation, said cavity substantially completely surrounded by walls comprising formations of salt.

2. The method of claim 1, wherein the leaching is with a solvent comprising water.

3. The method of claim 1 further comprising:

drilling a second bore hole from an above surface location into the substantially horizontal salt formation;

leaching salt from said substantially horizontal salt formation through the second bore hole to produce a cavity for receiving insolubles.

4. The method of claim 3, wherein the slanting of the bore hole comprises slanting the bore hole to intersect with the cavity for receiving insolubles.

5. The method of claim 4, wherein the leaching of the salt comprises:

supplying solvent under controlled conditions to the means for supplying a solvent for salt;

dissolving salt from the substantially horizontal salt formation with said supplied solvent to produce a concentrated brine;

removing said concentrated brine through the second bore hole; and collecting insolubles settling from the concentrated brine in the cavity for receiving insolubles.

6. A method of producing a storage cavern in a naturally-occurring underground salt formation, the method comprising:

drilling a first bore hole from an above-ground surface location into the underground salt formation;

slanting the first bore hole during drilling to produce an elongate conduit extending along a substantially horizontal plane in the underground salt formation;

inserting a blocked off end of a pipe string into the first bore hole;

introducing a length of the pipe string, comprising holes of predetermined size at predetermined spacings, into the elongate conduit;

charging solvent for salt to the pipe string so that the solvent exits from the holes; and leaching salt from the salt formation around the pipe string to create a cavity extending into the salt formation, said cavity substantially completely surrounded by walls comprising formations of salt.

7. The method of claim 6 wherein the leaching is with a solvent comprising water.

8. The method of claim 6 further comprising:

drilling a second bore hole from an above-surface location into the salt formation;

leaching salt from said salt formation through the second bore hole to produce a cavity for receiving insolubles.

9. The method of claim 8 wherein the slanting of the bore hole comprises slanting the bore hole to intersect with the cavity for receiving insolubles.

10. The method of claim 9 wherein the leaching of salt comprises:

supplying solvent under controlled conditions to the pipe string;

dissolving salt from the salt formation with said supplied solvent to produce a concentrated brine;

removing said concentrated brine through the second bore hole; and collecting insolubles settling from the concentrated brine in the cavity for receiving insolubles.

11. A method of producing a storage cavern for gaseous material in a naturally-occurring underground salt formation, the method comprising:

introducing a perforated pipe string, in a substantially horizontal plane, into the salt formation;

supplying solvent, at controlled rates, through holes of predetermined size at predetermined spacings in said pipe string; and leaching salt from the salt formation around the pipe string to produce a cavity extending into the salt formation, said cavity substantially completely surrounded by walls comprising formations of salt.

12. The method of claim 11 whereby said leaching step produces a brine solution and further comprising removing the brine solution through a bore hole.

* * * * *

UNITED STATES PATENT AND TRADEMARK OFFICE
CERTIFICATE OF CORRECTION

PATENT NO. : 5,431,482

DATED : July 11, 1995

INVENTOR(S) : Anthony Russo

It is certified that error appears in the above-identified patent and that said Letters Patent is hereby corrected as shown below:

In Column 1, before the "BACKGROUND OF THE INVENTION" please insert the following:

--The Government has rights in this invention pursuant to Contract No. DE-AC04-76DP00789 awarded by the U.S. Department of Energy.--

Signed and Sealed this

Nineteenth Day of September, 1995

Attest:

BRUCE LEHMAN

Attesting Officer

Commissioner of Patents and Trademarks